3,651,176
METHOD FOR PREPARING ADHESION-IMPROVED ETHYLENE-PROPYLENE RUBBER COMPOSITION
Teruyoshi Usamoto, Higashiosaka, Masao Yokota, Ibaraki, and Tamotu Kondo, Toyonaka, Japan, assignors to Sumitomo Chemical Company, Limited, Osaka, Japan
No Drawing. Filed June 11, 1969, Ser. No. 832,884
Claims priority, application Japan, June 11, 1968, 43/40,365
Int. Cl. C08f 37/18
U.S. Cl. 260—897 C                    2 Claims

ABSTRACT OF THE DISCLOSURE

A rubber of improved adhesion is prepared by a process comprising mixing an ethylene-propylene rubber with a halogenated butyl rubber or a halogenated ethylene-propylene rubber in an amount of 2–50 parts by weight per 100 parts by weight of the ethylene-propylene rubber.

---

The present invention relates to a process for producing an ethylene-propylene rubber composition of which the adhesivity has been improved. Particularly, the invention is directed to a process for producing a composition having good adhesivity by mixing an ethylene-propylene rubber with a halogenated ethylene-propylene rubber or a halogenated butyl rubber.

The ethylene-propylene rubbers are excellent in weather resistance, ozone resistance, heat resistance, chemical resistance and the like, compared with conventional natural rubber and other synthetic rubbers such as polyisoprene, styrene-butadiene rubber, polybutadiene rubber and the like, and the products of ethylene-propylene rubber, in which the above properties have been utilized, are very useful.

Accordingly, various articles having excellent ozone resistance, weather resistance and the like, for example, automobile parts, construction accessories, electric wires and cables, hoses, industrial parts, etc., have been manufactured from the ethylene-propylene rubber alone or ethylene-propylene rubber mixed with natural rubber or synthetic rubber such as styrene-butadiene rubber, polyisoprene rubber or the like according to compression molding, injection molding, extrusion molding methods and the like.

In general, however, when natural rubber, styrene-butadiene rubber, polybutadiene rubber or the like is used alone, there are involved problems in weather resistance, ozone resistance and chemical resistance. On the other hand, when ethylene-propylene rubber is used alone, the use thereof is more disadvantageous than in the case of the aforesaid rubbers because of a high price thereof though it can sufficiently satisfy the above-mentioned various properties. Therefore, the ethylene-propylene rubbers are not much used.

Accordingly, it is naturally thought of mixing an ethylene-propylene rubber with natural rubber, styrene-butadiene rubber, polybutadiene rubber, etc. and thereby to try to improve weather resistance and ozone resistance. In this case, however, in order to sufficiently satisfy weather resistance and ozone resistance (particularly in the case where an inorganic filler is blended), the ethylene-propylene rubber to be blended should be within a range of large amount. Also, in that case, when the ethylene-propylene rubber is blended with natural rubber, styrene-butadiene rubber, polybutadiene rubber or the like, physical properties of the resulting rubber are markedly lowered because covulcanization cannot be effected particularly in the sulfur vulcanization system.

Furthermore, articles of the ethylene-propylene rubber for which tackiness and adhesivity are required have not been put into practical use, because the rubber is poor in tackiness and adhesivity. For example, when a two-layer extrusion article is manufactured, the ethylene-propylene rubber is used as an outer layer rubber and natural rubber, styrene-butadiene rubber, polybutadiene rubber or the like is used as an inner rubber to try to obtain an article excellent in weather resistance, ozone resistance, chemical resistance, etc. at low cost, a peeling-off phenomenon is observed between the outer layer rubber of and the inner rubber of the resulting article, because the ethylene-propylene rubber, which has been used as the outer layer rubber, is low in tackiness and adhesivity, and consequently it is difficult to obtain a satisfactory article.

Therefore, it is considered to use a halogenated butyl rubber, halogenated ethylene-propylene rubber or chlorosulfonated polyethylene rubber as an outer layer rubber as a means for solving the problem of adhesivity between the rubber layers, but such means requires a high cost and has not been put into practice except the particular case.

The similar problem to above is also brought about in the case of manufacturing sponges. That is, an article of sponge prepared from natural rubber, styrene-butadiene rubber or polybutadiene rubber similarly involves a problem in weather resistance, ozone resistance, thermal resistance, etc. Accordingly, the rubber sponges having polychloroprene rubber as outer layer rubber are presently manufactured in general, as described in the case of the two-layer article above, by using natural rubber or styrene-butadiene rubber as a rubber sponge portion. In this case, the reason why a polychloroprene rubber is used as the outer layer rubber is that the polychloroprene rubber is excellent in adhesivity and also excellent in weather resistance, ozone resistance, etc., compared with natural rubber, styrene-butadiene rubber or the like. However, such properties of the polychloroprene rubber are by far inferior to those of the ethylene-propylene rubber, and the polychloroprene rubber is expensive as compared with the ethylene-propylene rubber. Further, the weather resistance of the polychloroprene rubber is found to be favorable only when carbon black is blended, and when blended with an inorganic filler, for example, calcium carbonate, clay, silica, silicates or talc, the weather resistance is remarkably lowered, and therefore, the polychloroprene rubber is only manufactured, with which carbon black has been blended.

The present invention is directed to a process for producing a composition having excellent weather resistance, ozone resistance, thermal resistance, chemical resistance, etc., also having good adhesivity that covers defects of the ethylene-propylene rubber in tackiness and adhesivity and being prepared by mixing a halogenated ethylene-propylene rubber or a halogenated butyl rubber having compatibility as well as good tackiness and adhesivity with an ethylenepropylene rubber without sacrificing excellent weather resistance, ozone resistance, thermal resistance, chemical resistance, etc. of the ethylene-propylene rubber, which comprises mixing 100 parts by weight of the ethylene-propylene rubber with 2–50 parts, preferably 5–20 parts by weight of the halogenated ethylene-propylene rubber or the halogenated butyl rubber.

The ethylene-propylene rubber referred to in the present invention is an ethylene-propylene copolymer or an ethylene-propylene-non-conjugated diene ternary copolymer containing, as the non-conjugated diene component, dicyclopentadiene, methylene norbornene, ethylidene norbornene, 1,4-hexadiene, 4,7,8,9-tetrahydroindene or the like.

The halogenated butyl rubber referred to in the present invention is a rubber prepared by halogenating a butyl rubber which is a copolymer of isobutene and a small amount of isoprene, thereby to introduce a small amount of halogen into the molecule, and the amount of halogen to be introduced is 0.5–20% by weight.

Furthermore, the halogenated ethylene-propylene rubber referred to herein is an ethylene-propylene rubber, into the molecule of which a small amount of halogen has been introduced, and the amount of halogen to be introduced is 0.5–40% by weight.

In each of the above cases, when the halogen content is above the upper limit the halogenated rubber becomes a resinous state and its compatibility with the ethylene-propylene rubber becomes poor. On the other hand, if the halogen content is below the lower limit, no improvement in adhesivity is observed when blended with the ethylene-propylene rubber.

In the present invention, the vulcanized rubber composition contains essentially the ethylene-propylene rubber and the halogenated butyl rubber or the halogenated ethylene-propylene rubber, but, if necessary, such rubber additives as a filler, process oil, stearic acid, zinc oxide, antioxidant, vulcanizing agent, flame retarder and the like may also be added.

The ethylene-propylene rubber and the halogenated butyl rubber or the halogenated ethylene-propylene rubber can be mixed together by using any of known methods, for example, a two-roll mill, a Banbury mixer or the like. The composition obtained by mixing can be made, for example, by a calender roll into a sheet-like product or can be molded by using an extruder into an optional shape. The thus obtained rubber composition may be stuck on the other rubber composition obtained according to the same process or may be formed into a two-layer extrusion article and the resulting assembly is vulcanized. The vulcanizing method employed herein is not particularly limited and it can be carried out at the vulcanizing temperature range of from 120° to 200° C. according to the desired shape of article to be obtained by a compression molding using a hot platen press, direct steam heating method using steam, indirect heating method using hot air or continuous vulcanizing methods (e.g. molten metal salt method, fluidized bed method, oil bath method and the like).

The vulcanized rubber compositions obtained according to the process of the present invention are suitable for use in the field of application of ethylene-propylene rubber where adhesivity is particularly required, and exhibit excellent properties required therefor.

The present invention is explained more fully with reference to the following examples, but it is of course that the invention is not limited by those examples.

EXAMPLE 1

An ethylene-propylene-non-conjugated diene ternary copolymer (Royalene 501 produced by Uniroyal Co.), and blends of the said ternary copolymer with a halogenated butyl rubber (Hycar-2202, produced by Goodrich Gulf Chemicals Co.) and a halogenated ethylene-propylene non-conjugated diene terpolymer rubber (a halide of Royalene 501; a halogen content being 15% by weight) in the blending ratios shown in table were rolled by a two-roll mill at 40–50° C. 100 parts by weight each of the mixtures was mixed and kneaded by a two-roll mill with 1.5 parts by weight of sulfur, 1.5 parts by weight of zinc dimethyldithiocarbamate, 1.5 parts by weight of tetramethylthiuram disulfide and 0.5 part by weight of 2-mercaptobenzothiazol as vulcanizing agents, and 5 parts by weight of zinc oxide, 1 part by weight of stearic acid, 150 parts by weight of hard clay (Dexieclay, produced by R. T. Vanderbilt Co., Inc.) and 40 parts by weight of a process oil (Sonic P–200, produced by Kyodo Sekiyu K.K.) and thereby to prepare a composition. On the other hand, a mixture of 100 parts by weight of a styrene-butadiene rubber (JSR–1502, produced by Nippon Gosei Gomu K.K.), 1.5 parts by weight of sulfur, 1.0 parts by weight of N-cyclohexylbenzothiazylsulpheneamide as a vulcanization accelerator, 5 parts by weight of zinc oxide, 1 part by weight of stearic acid, 80 parts by weight of calcium carbonate (calcium carbonate Akadama, produced by Shiraishi Kogyo K.K.), surface treated calcium carbonate (Hakuenka O, produced by Shiraishi Kogyo K.K.), 30 parts by weight of talc (Mistron Vapor, produced by Sierra Talc & Chemical Corporation) and 30 parts by weight of a process oil (Sonic P–200, Kyodo Sekiyu K.K.) was mixed and kneaded by a two-roll mill and thereby to prepare a composition.

The former composition was placed on the latter and this assembly was subjected to direct steam vulcanization and to press vulcanization at 150° C. for 30 minutes. In this case, the press vulcanization was effected using a metal mold, so that a pressure may not be applied to the test sample except the metal mold pressure. The peeling-off test was determined using a chopper's type tensile tester at a tension rate of 500 mm./min. (for peeling-off at 180°).

The results thereof are shown in Table 1.

TABLE

| Blending | ① | ② | ③ | ④ | ⑤ | ⑥ |
|---|---|---|---|---|---|---|
| Ethylene-propylene rubber | 100 | 90 | 80 | 70 | 90 | |
| Halogenated butyl rubber | | 10 | 20 | 30 | | |
| Halogenated ethylene-propylene rubber | | | | | 10 | |
| Styrene-butadiene rubber | | | | | | 100 |
| Stearic acid | 1 | 1 | 1 | 1 | 1 | 1 |
| Zinc oxide | 5 | 5 | 5 | 5 | 5 | 5 |
| Sulfur | 1.5 | 1.5 | 1.5 | 1.5 | 1.5 | 1.5 |
| Hard clay | 150 | 150 | 150 | 150 | 150 | |
| Talc | | | | | | 30 |
| Surface treated calcium carbonate | | | | | | 40 |
| Calcium carbonate | | | | | | 80 |
| Process oil | 40 | 40 | 40 | 40 | 40 | 30 |
| Znc dimethyldithiocarbamate | 1.5 | 1.5 | 1.5 | 1.5 | 1.5 | |
| Tetramethylthiuram disulfide | 1.5 | 1.5 | 1.5 | 1.5 | 1.5 | |
| 2-mercaptobenzothiazol | 0.5 | 0.5 | 0.5 | 0.5 | 0.5 | |
| N-cyclohexylbenzothiazylsulpheneamide | | | | | | 1 |

TABLE 1.—ADHESIVE STRENGTH (PEELING-OFF TEST). kg./20 mm.

| Assembly of the blendings | Press vulcanization | Direct steam vulcanization |
|---|---|---|
| ①+⑥ | 2.10 | 2.80 |
| ②+⑥ | 5.80 | 5.80 |
| ③+⑥ | 3.80 | 4.00 |
| ④+⑥ | 3.40 | 3.60 |
| ⑤+⑥ | 5.20 | 5.30 |

EXAMPLE 2

A mixture of 90 parts by weight of an ethylenepropylene-non-conjugated diene ternary copolymer (Royalene 501, produced by Uniroyal Co.) and 10 parts by weight of a halogenated butyl rubber (Hycar-2202, produced by Goodrich Gulf Chemicals Co.) in the proportion shown in table was kneaded by a two-roll mill maintained at 40–50° C. 100 parts of this blend was mixed and kneaded by a two-roll mill with 1.5 parts by weight of sulfur, 1.5 parts by weight of zinc dimethyldithiocarbamate, 1.5 parts by weight of tetramethylthiuram disulfide and 0.5 part by weight of 2-mercaptobenzothiazol as vulcanization accelerators, 5 parts by weight of zinc oxide, 1 part by weight of stearic acid, 150 parts by weight of a hard clay (Dexieclay, produced by R. T. Vanderbilt Co., Inc.) and 40 parts by weight of a process oil (Sonic P–200, produced by Kyodo Sekiyu K.K.), and whereby to prepare a composition. On the other hand, 100 parts by weight of a styrene-butadiene rubber (JSR–1502, produced by Nippon Gosei Gomu K.K.) was mixed and kneaded by a two roll-mill with 1.5 parts by weight of sulfur, 1.5 parts by weight of N-cyclohexylbenzothiazylsulpheneamide as a vulcanization accelerator, 5 parts by weight of zinc oxide, 1 part by weight of stearic acid, 80 parts by weight of light calcium carbonate (calcium carbonate, Akadama, produced by Shiraishi Kogyo K.K.) 40 parts by weight of a surface treated calcium carbonate (Hakuenka O, produced by Shiraishi Kogyo K.K.), 30 parts by weight of talc (Mistron Vapor, Sierra Talc & Chemical Corporation) and 15 parts by weight of a process oil (Sonic P-200, produced by Kyodo Sekiyu K.K.), and thereby to prepare a composition. These two compositions were charged in separate extruders respectively to obtain a two-layer extrusion article, so that the former composition may constitute an outer layer rubber and the latter may constitute an inner rubber. The obtained article was vulcanized at 150° C. for 40 minutes using a direct steam vulcanization drum. Thereafter, adhesive strength of the two layers (the outer layer rubber and the inner rubber) of the article was determined, whereby the strength was found to be 6.5 kg./20 mm.

In this case, the extruders employed have 50 mm. $\phi$, $L/D=8$ and number of rotation being 40 r.p.m., respectively, and the outer layer rubber was 1 mm. in thickness and the inner rubber was 10 mm. $\phi$.

Furthermore, as a test sample for comparision, the article, of which the outer layer rubber was made of an ethylene-propylene rubber alone, is also shown in the table. The comparative test sample had the same blending and was subjected to the same conditions as in the case of the present outer layer rubber.

TABLE

| Blending | Outer layer rubber | Inner rubber | Outer layer rubber of comparative test sample |
|---|---|---|---|
| Ethylene-propylene rubber | 90 | | 100 |
| Styrene-butadiene rubber | | 100 | |
| Halogenated butyl rubber | 10 | | |
| Stearic acid | 1 | 1 | 1 |
| Zinc oxide | 5 | 5 | 5 |
| Sulfur | 1.5 | 2 | 1.5 |
| Hard clay | 150 | | 150 |
| Talc | | 30 | |
| Surface treated calcium carbonate | | 40 | |
| Light calcium carbonate | | 80 | |
| Process oil | 40 | 15 | 40 |
| Zinc dimethyldithiocarbamate | 1.5 | | 1.5 |
| Tetramethylthiuram disulfide | 1.5 | | 1.5 |
| 2-Mercaptobenzothiazol | 0.5 | | 0.5 |
| N-cyclohexylbenzothiazylsulpheneamide | | 1.5 | |

| General physical properties | Outer layer rubber | Inner rubber | Outer layer rubber of comparative test sample |
|---|---|---|---|
| 300% tensile stress, kg./cm.² | 18 | 18 | 30 |
| Tensile strength, kg./cm.² | 96 | 86 | 105 |
| Elongation, percent | 970 | 830 | 800 |
| Hardness, Hs | 54 | 56 | 61 |
| Adhesion strength (peeling-off strength) kg./20 mm. | 6.5 | | 2.8 |
| Ozone resistance (60 p.p.h.m.; elongation, 20%; temperature, 50° C.; 500 hours). | No change | | No change |

EXAMPLE 3

The same procedure as in Example 1 was repeated except that the blendings shown in the following table were employed, and thereby to obtain a two-layer extrusion article. The physical properties of the article were given hereinbelow.

| Blending | Outer layer rubber | Inner rubber |
|---|---|---|
| Ethylene-propylene copolymer [1] | 90 | |
| Styrene-butadiene rubber | | 100 |
| Halogenated butyl rubber | 10 | |
| Stearic acid | 1 | 1 |
| Zinc oxide | 5 | 5 |
| Sulfur | 0.3 | 0.3 |
| Dicumyl peroxide [2] | 8.0 | 5.0 |
| Clay [3] | 120 | |
| Talc | | 30 |
| Surface treated calcium carbonate | | 40 |
| Light calcium carbonate | | 80 |
| Process oil | 20 | 15 |

[1] Dutal N/C. (a product of Monte Edison Co.).
[2] Dicup 40 C (a product of Hercules Co.).
[3] Translink—37 (a product of Freeport Kaolin Co.).

| General physical properties | Outer layer rubber | Inner rubber |
|---|---|---|
| 300% tensile stress, kg./cm.² | 20 | 18 |
| Tensile strength, kg./cm.² | 90 | 85 |
| Elongation, percent | 800 | 850 |
| Hardness, Hs | 55 | 54 |
| Adhesion strength (peeling-off strength) kg./20 mm. | 6.5 | |
| Ozone resistance (60 p.p.m.; elongation 20%; temperature 50° C.; 500 hours). | No change | |

EXAMPLE 4

The same procedure as in Example 1 was repeated except that the blendings shown in the following table were employed, and thereby to obtain a two-layer extrusion article. The physical properties of the article were given hereinbelow.

| Blending | Outer layer rubber | Inner rubber |
|---|---|---|
| Ethylene-propylene ternary [1] copolymer | 90 | |
| Styrene-butadiene rubber | | 100 |
| Halogenated butyl rubber | 10 | |
| Stearic acid | 1 | 1 |
| Zinc oxide | 5 | 5 |
| Sulfur | 1.5 | 2 |
| Hard clay | 120 | |
| Talc | | 30 |
| Surface treated calcium carbonate | 30 | 40 |
| Calcium carbonate | | 80 |
| Process oil | 40 | 15 |
| Zinc dimethyldithiocarbamate | 1.5 | |
| Tetramethylthiuram disulfide | 1.5 | |
| 2-mercaptobenzothiazol | 0.5 | |
| N-cyclohexylbenzothiazolsulphenamide | | 1.5 |

[1] Nordel 1070 (a product of Dupont Co.; 1,4-hexadiene being the third component).

| General physical properties | Outer layer rubber | Inner rubber |
|---|---|---|
| 300% tensile stress, kg./cm.² | 20 | 18 |
| Tensile strength, kg./cm.² | 105 | 86 |
| Elongation, percent | 750 | 830 |
| Hardness, Hs | 58 | 56 |
| Adhesion strength (peeling-off strength) kg./20 mm. | 6.7 | |
| Ozone resistance (60 p.p.m.; elongation, 20%, temperature, 50° C.; 500 hours). | No change | |

We claim:
1. A composition characterized by improved adhesion comprising a blend of 100 parts by weight of an unsaturated ethylene-propylene-non-conjugated diene terpolymer rubber with from 2 to 50 parts by weight of halogenated ethylenepropylene-non-conjugated diene terpolymer rubber containing 0.5–40% by weight of halogen.

2. A vulcanized composition as in claim 1.

References Cited

UNITED STATES PATENTS 3,374,198  3/1968  Como et al. _____ 260—41
3,296,183  1/1967  Schoenbeck _____ 260—41

FOREIGN PATENTS 987,827  3/1965  Great Britain _____ 260—848

OTHER REFERENCES

Ladosci et al., Def. Pub. of Serial No. 657,493 published in 857, O.G., 1039, on Dec. 24, 1968.

MURRAY TILLMAN, Primary Examiner

C. J. SECCURO, Assistant Examiner

U.S. Cl. X.R.

161—252, 253; 260—23 X A, 23 H, 23.7 B, 41 A, 41 R, 79.5 P, 79.5 A, 889